(12) United States Patent
Yamada et al.

(10) Patent No.: US 8,023,190 B2
(45) Date of Patent: *Sep. 20, 2011

(54) ANTIREFLECTION STRUCTURE AND OPTICAL DEVICE INCLUDING THE SAME

(75) Inventors: Kazuhiro Yamada, Osaka (JP);
Takamasa Tamura, Osaka (JP);
Motonobu Yoshikawa, Osaka (JP);
Hiroshi Yamaguchi, Osaka (JP);
Kazuhiko Ishimaru, Osaka (JP)

(73) Assignee: Panasonic Corporation, Osaka (JP)

( * ) Notice: Subject to any disclaimer, the term of this patent is extended or adjusted under 35 U.S.C. 154(b) by 203 days.

This patent is subject to a terminal disclaimer.

(21) Appl. No.: 11/798,534

(22) Filed: May 15, 2007

(65) Prior Publication Data

US 2007/0285784 A1 Dec. 13, 2007

(30) Foreign Application Priority Data

May 15, 2006 (JP) .................................. 2006-134916

(51) Int. Cl.
*G02B 27/00* (2006.01)
(52) U.S. Cl. ........................................ 359/577; 359/569
(58) Field of Classification Search .................. 359/569, 359/577
See application file for complete search history.

(56) References Cited

U.S. PATENT DOCUMENTS

| | | | |
|---|---|---|---|
| 4,944,986 A | 7/1990 | Zuel | |
| 6,359,735 B1 * | 3/2002 | Gombert et al. | ............... 359/580 |
| 2002/0050289 A1 | 5/2002 | Wada et al. | |
| 2003/0180476 A1 * | 9/2003 | Yamashita et al. | ............. 428/1.1 |
| 2004/0017526 A1 * | 1/2004 | Kuo | ............... 349/110 |
| 2004/0140516 A1 * | 7/2004 | Yoshikawa et al. | ........... 257/437 |
| 2005/0063066 A1 | 3/2005 | Namioka et al. | |

FOREIGN PATENT DOCUMENTS

| | | |
|---|---|---|
| JP | 49-11904 | 2/1974 |
| JP | 2001-127852 A | 5/2001 |
| JP | 2001-517319 A | 10/2001 |
| JP | 2002-286906 | 10/2002 |
| JP | 2003-114316 | 4/2003 |
| JP | 2004-012856 | 1/2004 |
| JP | 2005-031538 | 2/2005 |
| JP | 2005-234554 | 9/2005 |
| WO | WO 98/39673 | 9/1998 |
| WO | WO 2005/116695 | * 12/2005 |

OTHER PUBLICATIONS

Raguin, D. H., et al., "Analysis of antireflection-structured surfaces with continuous one-dimensional surface profiles", Applied Optics, May 10, 1993, pp. 2582-2598, vol. 32, No. 14, Optical Society of America.

D.H. Raguin et al., "Antireflection structured surfaces for the infrared spectral region," Applied Optics, vol. 32, No. 7, Mar. 1, 1993, pp. 1154-1167.

European Search Report issued in European Patent Application No. EP 07 10 8237.4 dated Feb. 9, 2010.

Japanese Notice of Reason for Rejection, with Concise explanation in English, issued in Japanese Patent Application No. 2006-134920, dated Mar. 15, 2011.

* cited by examiner

*Primary Examiner* — Joshua L Pritchett
(74) *Attorney, Agent, or Firm* — McDermott Will & Emery LLP (57) ABSTRACT

A diffusing plate has a surface including a plurality of fine concave/convex portions regularly arranged within a cycle equal to or smaller than a predetermined wavelength. The surface has a larger surface roughness than the predetermined wavelength. An average value for an angle between a normal vector of the tangent plane of a roughness shape of the surface and a normal vector of a reference plane of the surface is 5 degrees or more.

12 Claims, 6 Drawing Sheets

ANTIREFLECTION STRUCTURE AND OPTICAL DEVICE INCLUDING THE SAME

BACKGROUND OF THE INVENTION

1. Field of the Invention

The present invention relates to an antireflection structure and an optical device including the antireflection structure.

2. Description of Prior Art

In recent years, various kinds of optical devices in which antireflection processing for suppressing reflection of light is performed to a surface have been proposed. As antireflection processing, for example, processing for formation of an antireflection film including a film having a relatively low refractive index (which will be herein referred to as a "low refractive index film"), a multilayer film in which a low refractive index film and a film having a relatively high refractive index (which will be herein referred to as a "high refractive index film") are alternately stacked, or like film has been proposed (for example, see Japanese Laid-Open Publication No. 2001-127852 and the like).

However, for formation of an antireflection film including a low refractive index film or a multilayer film, complex processing such as vapor deposition, sputtering and the like need to be performed. Thus, although productivity is low, production costs become high. Moreover, an antireflection film including a low refractive index film or a multilayer film has high dependency on wavelength and incident angle.

In view of the above-described problems, as antireflection processing relatively less dependent on incident angle and wavelength, for example, processing in which fine concave/convex portions are regularly formed on a surface of an optical device with a pitch equal to or smaller than a wavelength of incident light has been proposed (for example, Daniel H. Raguin and G. Michael Morris, "Analysis of antireflection-structured surfaces with continuous one-dimensional surface profiles", Applied Optics, vol. 32, No. 14, pp. 2582-2598, 1993, and the like). By performing this processing, abrupt change in refractive index in a device interface can be suppressed, so that a refractive index is gradually changed at a device surface. Accordingly, reflection at a surface of an optical device is reduced and a high impingement rate for incident light into the optical device can be achieved.

In National Publication of Translated Version No. 2001-517319, a technique in which fine concave/convex portions are formed on a rough surface is disclosed.

SUMMARY OF THE INVENTION

However, even when fine concave/convex portions are formed on a surface of an optical device so as to be regularly arranged with a pitch equal to or smaller than a wavelength of incident light, there are cases where a sufficiently high antireflection effect can not be achieved.

The present invention has been devised in view of the above-described points and it is therefore an object of the present invention to provide an antireflection structure having a high antireflection effect.

As a result of keen studies, the present inventors found that when fine concave/convex portions are formed on a smooth surface (for example, a flat and smooth surface), reflection of light is not sufficiently suppressed depending on an incident angle and, more specifically, reflection of light at a relatively large incident angle is not sufficiently suppressed (i.e., reflection coefficient has incident angle dependency). The present inventors also found that when fine concave/convex portions are formed on a rough surface, the dependency of reflection coefficient on incident angle is reduced but there are still cases where incident angle dependency is not sufficiently reduced, and the present inventors has reached the present invention.

Specifically, a first antireflection structure according to the present invention is directed to an antireflection structure for suppressing reflection of light having a wavelength equal to or larger than a predetermined wavelength and is characterized in that the antireflection structure includes a surface including a plurality of fine concave/convex portions regularly arranged within a cycle equal to or smaller than the predetermined wavelength, the surface has a larger surface roughness than the predetermined wavelength, and an average value for an angle between a normal vector of a tangent plane of a roughness shape of the surface and a normal vector of a reference plane of the surface is 5 degrees or more.

Note that herein a "roughness shape" means to be a shape obtained by cutting off fine concave/convex portions 11 as high-frequency components. A "reference plane" means to be a plane obtained by cutting off the fine concave/convex portions and a roughness shape as high-frequency components. A "predetermined wavelength" means to be a wavelength of light of which reflection should be suppressed, or a wavelength of light of which reflection should be suppressed.

A second antireflection structure according to the present invention is directed to an antireflection structure for suppressing reflection of light having a wavelength equal to or larger than a predetermined wavelength and is characterized in that the antireflection structure includes a surface including a plurality of fine concave/convex portions regularly arranged within a cycle equal to or smaller than the predetermined wavelength, the surface has a larger surface roughness than the predetermined wavelength, and a peak of a distribution for an angle between a normal vector of a tangent plane of a roughness shape of the surface and a normal vector of a reference plane of the surface is larger than 0 degrees.

A third antireflection structure according to the present invention is directed to an antireflection structure for suppressing reflection of light having a wavelength equal to or larger than a predetermined wavelength and is characterized in that the antireflection structure includes a surface including a plurality of fine concave/convex portions regularly arranged within a cycle equal to or smaller than the predetermined wavelength, the surface has a larger surface roughness than the predetermined wavelength, and a percentage of an area per unit area of part in which an angle between a normal vector of a tangent plane of a roughness shape of the surface and a normal vector of a reference plane of the surface is 5 degrees or less is less than 80%.

A fourth antireflection structure according to the present invention is directed to an antireflection structure for suppressing reflection of light having a wavelength equal to or larger than a predetermined wavelength and is characterized in that the antireflection structure includes a surface including a plurality of fine concave/convex portions regularly arranged within a cycle equal to or smaller than the predetermined wavelength, the surface has a larger surface roughness than the predetermined wavelength, and a percentage of an area per unit area of part in which an angle between a normal vector of a tangent plane of a roughness shape of the surface and a normal vector of a reference plane of the surface is 10 degrees or less is less than 90%.

An optical device according to the present invention is characterized by including any one of the first through fourth antireflection structures of the present invention.

According to the present invention, an antireflection structure having a high antireflection effect can be achieved.

DESCRIPTION OF THE PREFERRED EMBODIMENTS

Hereafter, embodiments of the present invention will be described with reference to the accompanying drawings. Herein, using a diffusing plate implemented in accordance with the present invention as an example, an embodiment of an antireflection structure according to the present invention will be described. However, the antireflection structure according to the present invention is not limited to the following embodiments but may be applied to, for example, some other optical device such as a semiconductor laser device, a LED device, an electric bulb, a cold-cathode tube and the like, an image sensor such as a charge-coupled device (CCD), a CMOS and the like, an optical detector such as a power meter, an energy meter, a reflection coefficient measuring device and the like, a microlens array, a photo disc and the like.

Figure 1:
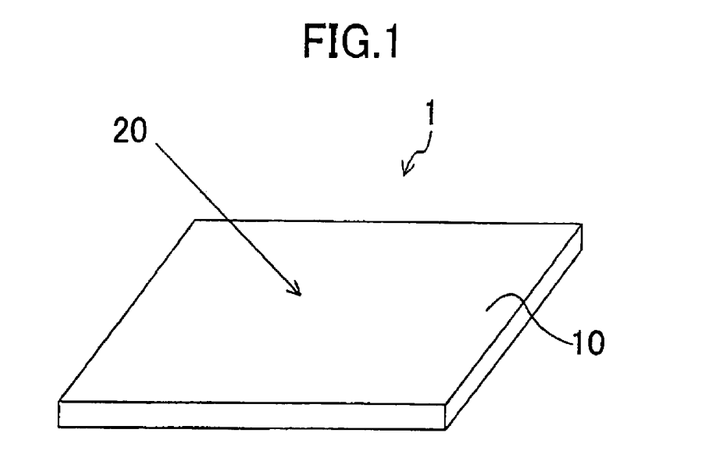
FIG. 1 is a schematic view of a diffusing plate 1.

FIG. 1 is a schematic view of a diffusing plate 1 according to this embodiment.

Figure 2:
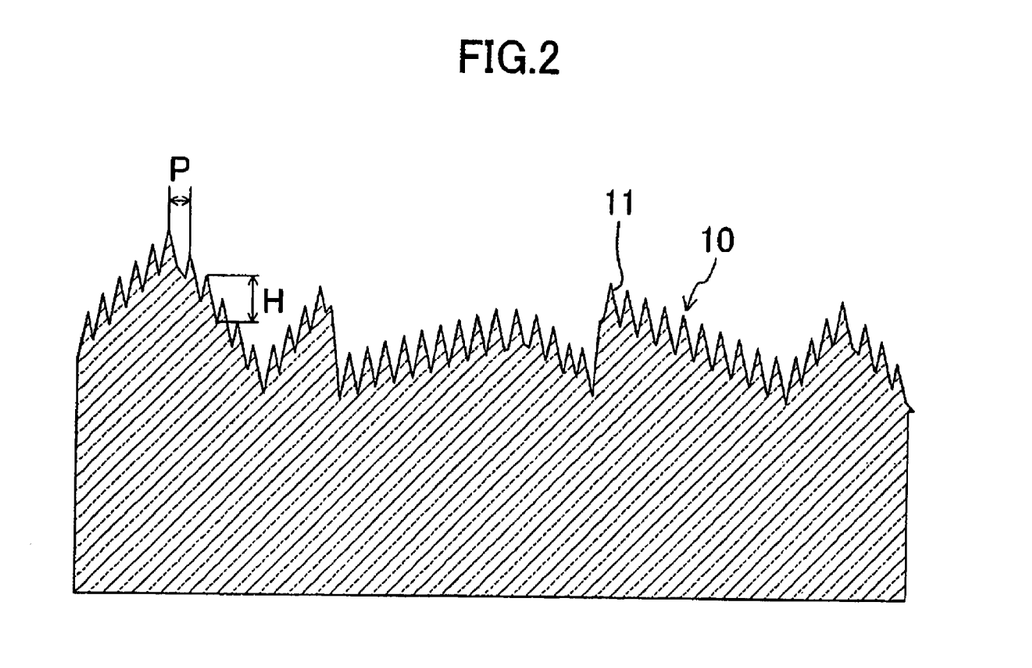
FIG. 2 is a cross-sectional view of part of the diffusing plate 1.

FIG. 2 is a cross-sectional view of part of the diffusing plate 1.

The diffusing plate 1 according to the present invention is a face material having an approximately rectangular shape when viewed from the top. The diffusing plate 1 diffuses light and transmits diffused light (more specifically, at least diffuses and transmits light of which reflection is suppressed by fine concave/convex portions 11 which will be described later). For example, the diffusing plate 1 is placed on a front of a display and the like and suppresses reflection of light (glare caused by extraneous light) at a display surface. Note that a material of the diffusing plate 1 is not particularly limited but the diffusing plate 1 may be formed of resin or glass. Also, particles and the like may be dispersedly mixed in the material.

Figure 3:
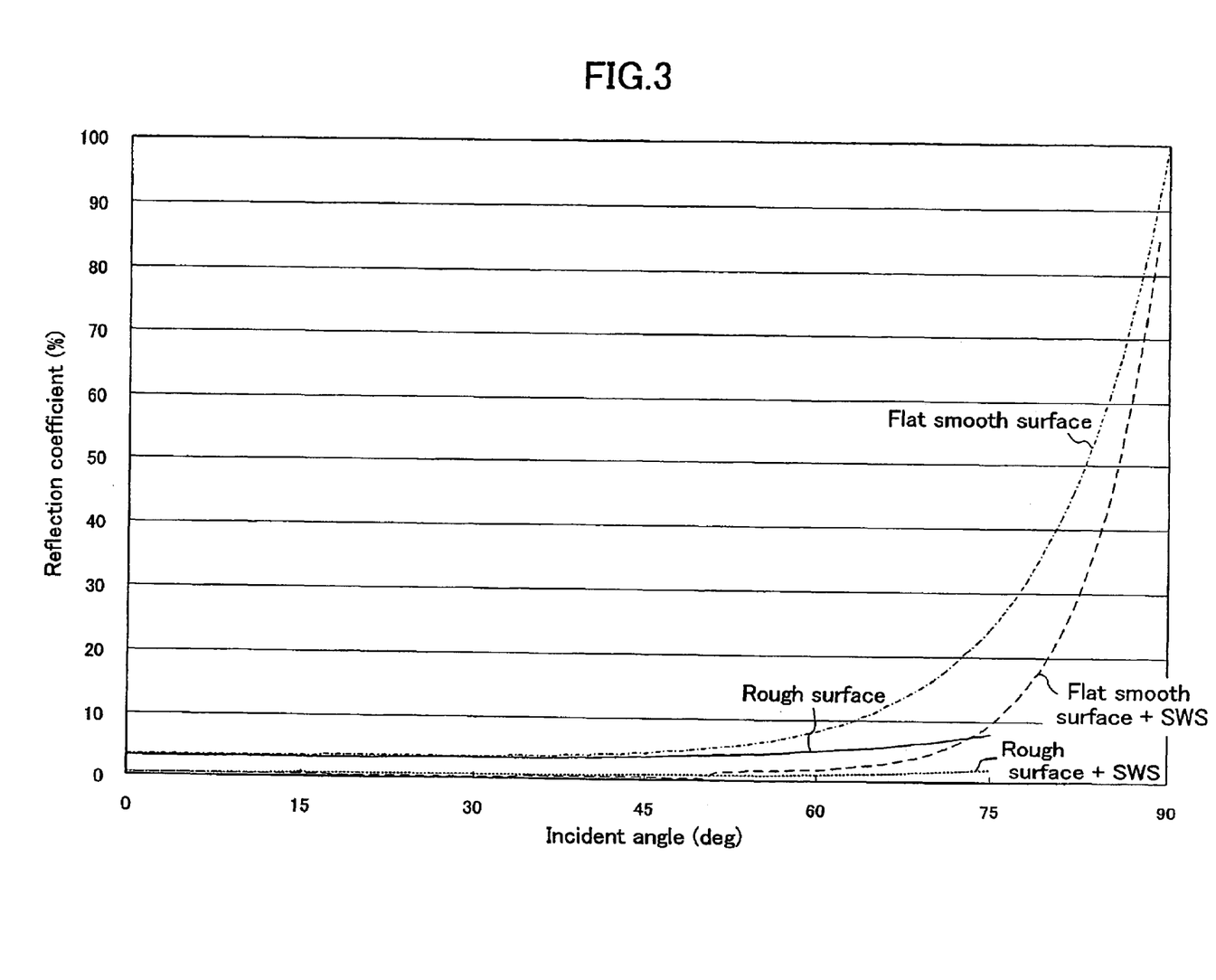
FIG. 3 is a graph showing the correlation between incident angle and reflection coefficient.

In this embodiment, as shown in FIG. 2, a plurality of fine concave/convex portions 11 are formed on a surface 10 of the diffusing plate 1 so as to be regularly arranged within a cycle equal to or smaller than a wavelength of incident light 20 (the cycle of the fine concave/convex portions 11 is preferably equal to or smaller than a smallest wavelength of incident light). (Hereafter, an antireflection structure in which the plurality of fine concave/convex portions 11 are formed will be occasionally referred to as "SWS".) Thus, abrupt change in refractive index between the surface 10 of the diffusing plate 1 and an air layer can be suppressed, so that a refraction index is gradually changed in a surface layer portion of the surface 10 including the fine concave/convex portions 11. Thus, as shown in FIG. 3, with the fine concave/convex portions 11 formed in the surface 10, reflection at the surface 10 of the diffusing plate 1 can be effectively suppressed.

As long as the fine concave/convex portions 11 have the function of moderating change in refractive index at an interface between the surface 10 and the air layer, a shape of each of the fine concave/convex portions 11 is not particularly limited. For example, each of the fine concave/convex portions 11 may be an approximately conical concave or convex (of which a top portion may be chamfered or R-chamfered), a prismoid concave or convex or a filiform concave or a filiform convex of which a cross-sectional shape is triangular, trapezoidal, rectangular or the like (of which edge portions may be R-chamfered).

In view of realizing high antireflection effect, a cycle (i.e., a distance between top points of adjacent ones of the fine concave/convex portions 11 when viewed from the top in the normal direction of a reference plane of the surface 10 formed to be a rough surface) of the fine concave/convex portions 11 is preferably equal to or smaller than a wavelength of incident light 20. A height (strictly speaking, defined to be a distance from the reference plane of the surface 10, which is formed to be a rough surface, in the normal direction of the reference plane) of each of the fine concave/convex portions 11 is preferably equal to or larger than 0.4 times as large as a wavelength of the incident light 20, more preferably equal to or larger than the wavelength, and even more preferably equal to or larger than three times as large as the wavelength. Strictly speaking, as in this embodiment, assume that the incident light 20 has a wavelength width. The cycle of the fine concave/convex portions 11 is preferably equal to or smaller than a smallest wavelength of incident light and the height of each of the fine concave/convex portions 11 is preferably equal to or larger than 0.4 times as large as the largest wavelength of the incident light 20 (more preferably the same as the largest wavelength and even more preferably equal to or larger than three times as large as the largest wavelength).

The fine concave/convex portions 11 do not have to exhibit antireflection effect for all the incident light 20. For example, when a wavelength of the incident light 20 is in a wide wavelength range including ultraviolet light, near-ultraviolet light, visible light, near-infrared light and infrared light but only reflection of light having a wavelength of 400 nm or more and 700 nm or less needs to be suppressed, the cycle of the fine concave/convex portions 11 is preferably equal to or smaller than 400 nm. The height of each of the fine concave/convex portions 11 is preferably equal to or larger 0.4 times as large as 700 nm, i.e., 280 nm or more.

The fine concave/convex portions 11 may be formed so that the height of the fine concave/convex portions 11 differs between different parts of the surface 10. However, in view of simplification of formation, the fine concave/convex portions 11 are preferably formed so that respective heights of the fine concave/convex portions 11 in the different parts are approximately the same. When the fine concave/convex portions 11 include conical/pyramidal concaves and conical/pyramid convexes, the fine concave/convex portions 11 are preferably formed so that a central axis of each of cones or pyramids, connecting a center point of a base and a top point of each of the cones or the pyramids, is approximately in parallel to central axises of other cones or pyramids. In this case, fabrication of the diffusing plate 1 by injection molding is simple. For the same reason, when the fine concave/convex portions 11 include filiform concaves and filiform convexes each having a triangular cross section, the plurality of the fine concave/ convex portions 11 are preferably formed so that a center axis of each of filiform portions, connecting respective center points of a top and a base of each of the filiform portions, is approximately in parallel to center axises of other filiform portions in each part (for example, having a size of 1 mm squares) of the surface 10.

As has been described, the plurality of fine concave/convex portions 11 are formed at the surface 10, so that reflection of light at the surface 10 can be suppressed. However, when the surface 10 is a smooth surface, regular reflection at the surface 10 can not be sufficiently suppressed.

Figure 4:
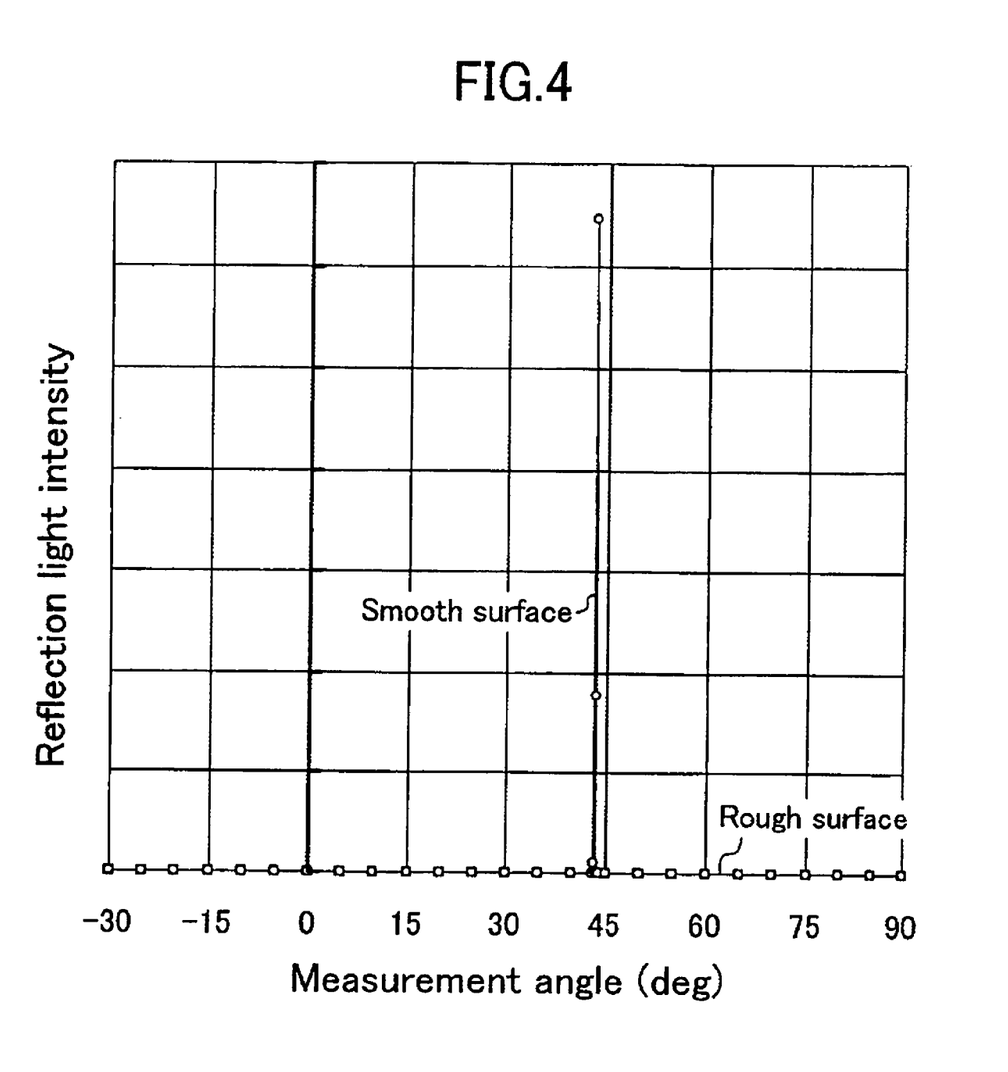
FIG. 4 is a graph showing reflection light intensity of incident light at an incident angle of 45 degrees.

FIG. 4 is a graph showing reflection light intensity of incident light at an incident angle of 45 degrees.

As shown in FIG. 4, when the fine concave/convex portions 11 are formed on a smooth surface, reflection light at an output angle of about 45 degrees, i.e., regular reflection is observed. In this manner, when the surface 10 in which the fine concave/convex portions 11 are formed is a smooth surface, regular reflection of the incident light 20 can not be sufficiently suppressed. In contrast, as shown in FIG. 4, when the fine concave/convex portions 11 are formed on a rough surface having a larger surface roughness than a wavelength of incident light, regular reflection is substantially not observed. In this embodiment, as shown in FIG. 2, the surface 10 is formed so as to be a rough surface having a larger surface roughness than a wavelength of incident light. More specifically, the surface 10 is formed so that a surface roughness in terms of maximum height roughness Rz defined in ISO4287: 1997 (JIS B0601: 2001) is larger than a wavelength of the incident light 20. Thus, in the diffusing plate 1 of this embodiment, regular reflection at the surface 10 can be sufficiently suppressed. Note that the effect of suppressing the generation of regular reflection tends to be reduced when the surface roughness of the surface 10 is too large. A preferable range of the surface roughness Rz of the surface 10 is 100 μm or less. The surface roughness Rz is more preferably 50 μm and even more preferably 30 μm.

As shown in FIG. 3, when the fine concave/convex portions 11 (SWS) are formed on a smooth surface, a sufficient antireflection effect for light at a relatively large incident angle can not be achieved. That is, reflection coefficient is dependent on incident angle. In contrast, as in this embodiment, the surface 10 on which the fine concave/convex portions 11 (SWS) are formed is formed to have a larger surface roughness than a wavelength of incident light into the surface 10, so that, as shown in FIG. 3, a sufficient antireflection effect for light at a relatively large incident angle can be also achieved while keeping low dependency of reflection coefficient on incident angle.

Figure 5:
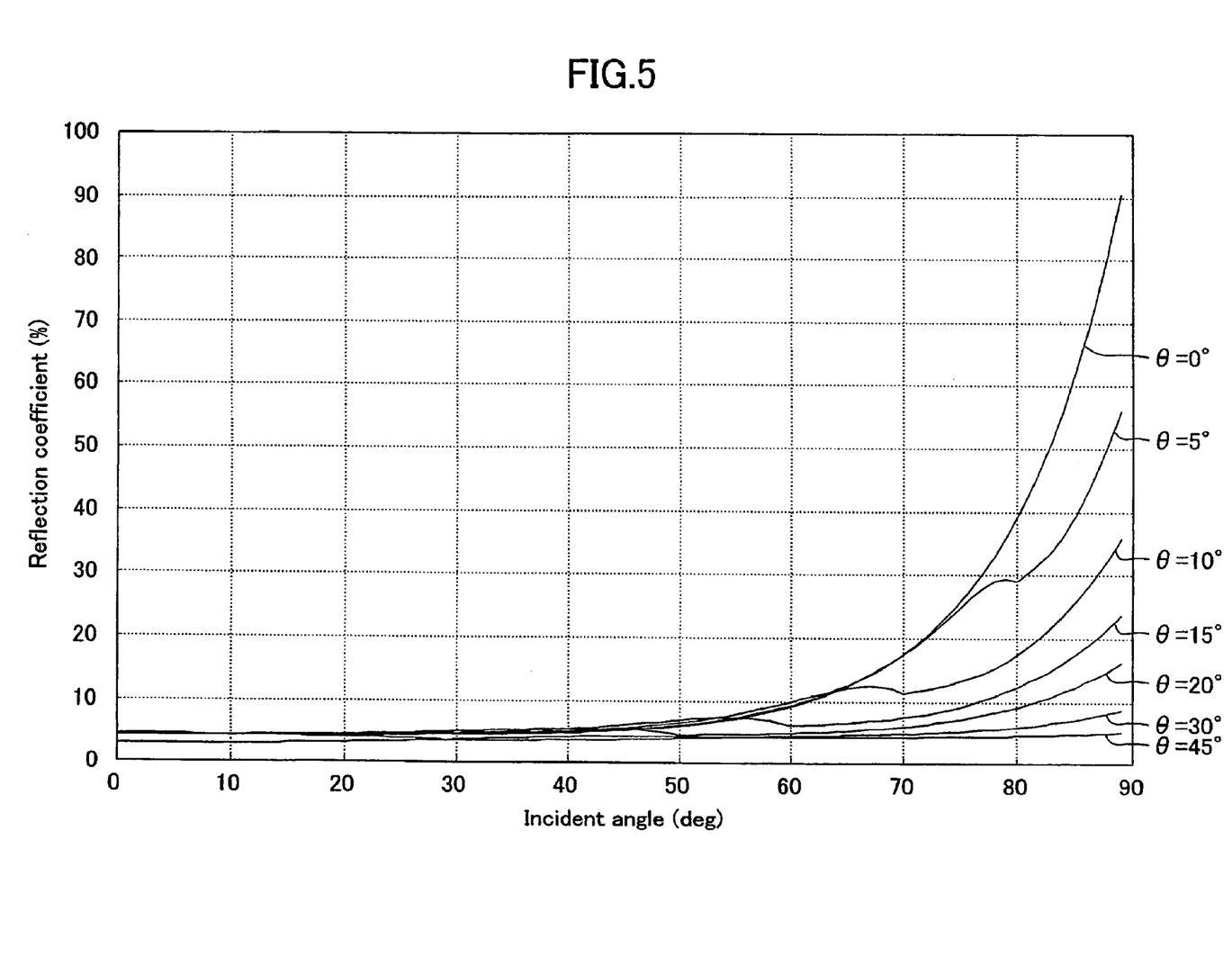
FIG. 5 is a graph showing the correlation between θ and reflection coefficient.
Figure 7:
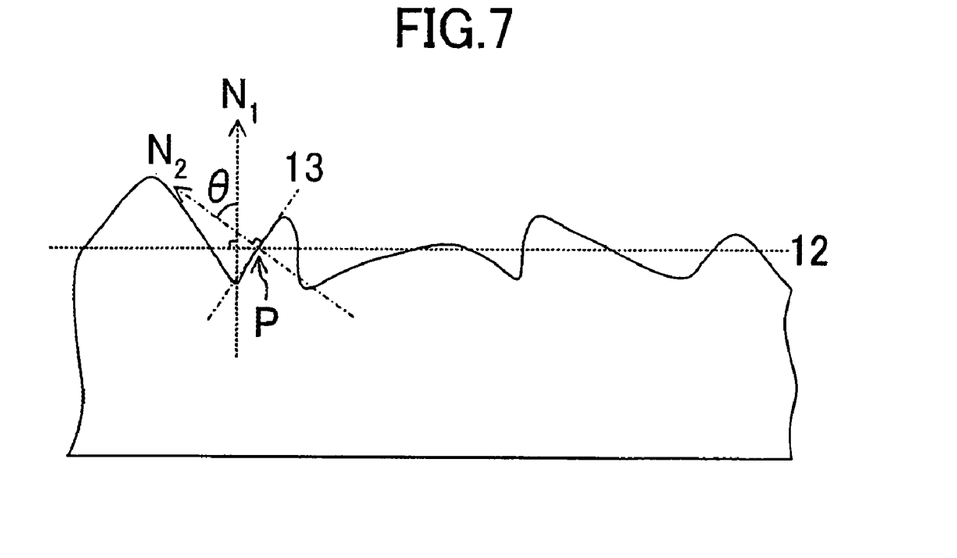
FIG. 7 is a cross-sectional view of a roughness shape of a surface 10 in the part shown in FIG. 2.

FIG. 5 is a graph showing the correlation between θ and reflection coefficient. Note that θ in FIG. 5 denotes an angle between a normal vector $N_2$ of a tangent plane 13 of a roughness shape of the surface 10 (in other words, a tangent plane of a shape obtained by cutting off the fine concave/convex portions 11 as high-frequency components from a shape of the surface 10 including the fine concave/convex portions 11) and a normal vector $N_1$ of a reference plane 12 of the surface 10 (see FIG. 7).

As shown in FIG. 5, assume that θ is 0 degrees (in other words, the surface 10 is a smooth surface). For example, when incident light has a large angle, i.e., a larger angle than 50 degrees or an even larger angle, i.e., a larger angle than 70 degrees, even with the fine concave/convex portions 11 formed, a reflection coefficient tends to be increased as an incident angle increases. In contrast, as θ is increased from 0 degrees, the dependency of reflection coefficient on incident angle is reduced, so that a high antireflection effect for light at a large incident angle can be achieved.

Specifically, the percentage of an area of part in which θ is 5 degrees or less per unit area (for example, per 1 mm squares) is preferably less than 80%. In other words, the percentage of an area per unit area of part in which θ is preferably 5 degrees or more is 20% or more. In such case, compared to the case where the fine concave/convex portions 11 are formed on a smooth surface, a reflection coefficient of light at an incident angle of 89 degrees can be reduced by about 30% or more. Moreover, the percentage of an area per unit area of part in which θ is 10 degrees or less is preferably less than 90%. In other words, the percentage of an area per unit area of the part in which θ is 10 degrees or more is 10% or more. Also, in this case, compared to the case where the fine concave/convex portions 11 are formed on a smooth surface, a reflection coefficient of light at an incident angle of 89 degrees can be reduced by about 30% or more.

More preferably, the percentage of the area per unit area of the part in which θ is 5 degrees or less is preferably less than 50%. In other words, the percentage of the area per unit area of the part in which θ is 5 degrees or more is preferably 50% or more. Moreover, the percentage of the area per unit area of the part in which θ is preferably 10 degrees or less is preferably less than 80%. In other words, the percentage of the area per unit area of the part in which θ is 10 degrees or more is preferably 20% or more. In such case, compared to the case where the fine concave/convex portions 11 are formed on a smooth surface, the reflection coefficient of light at an incident angle of 89 degrees can be reduced by about 50% or more.

More preferably, the percentage of the area per unit area of the part in which θ is 5 degrees or less is preferably less than 30%. In other words, the percentage of the area per unit area of the part in which θ is 5 degrees or more is preferably 70% or more. Moreover, the percentage of the area per unit area of the part in which θ is preferably 10 degrees or less is preferably less than 50%. In other words, the percentage of the area per unit area of the part in which θ is 10 degrees or more is preferably 50% or more. In such case, compared to the case where the fine concave/convex portions 11 are formed on a smooth surface, the reflection coefficient of light at an incident angle of 89 degrees can be reduced by about 70% or more.

Next, a preferable range of an average value ($\theta_{ave}$) of θ will be described.

Figure 6:
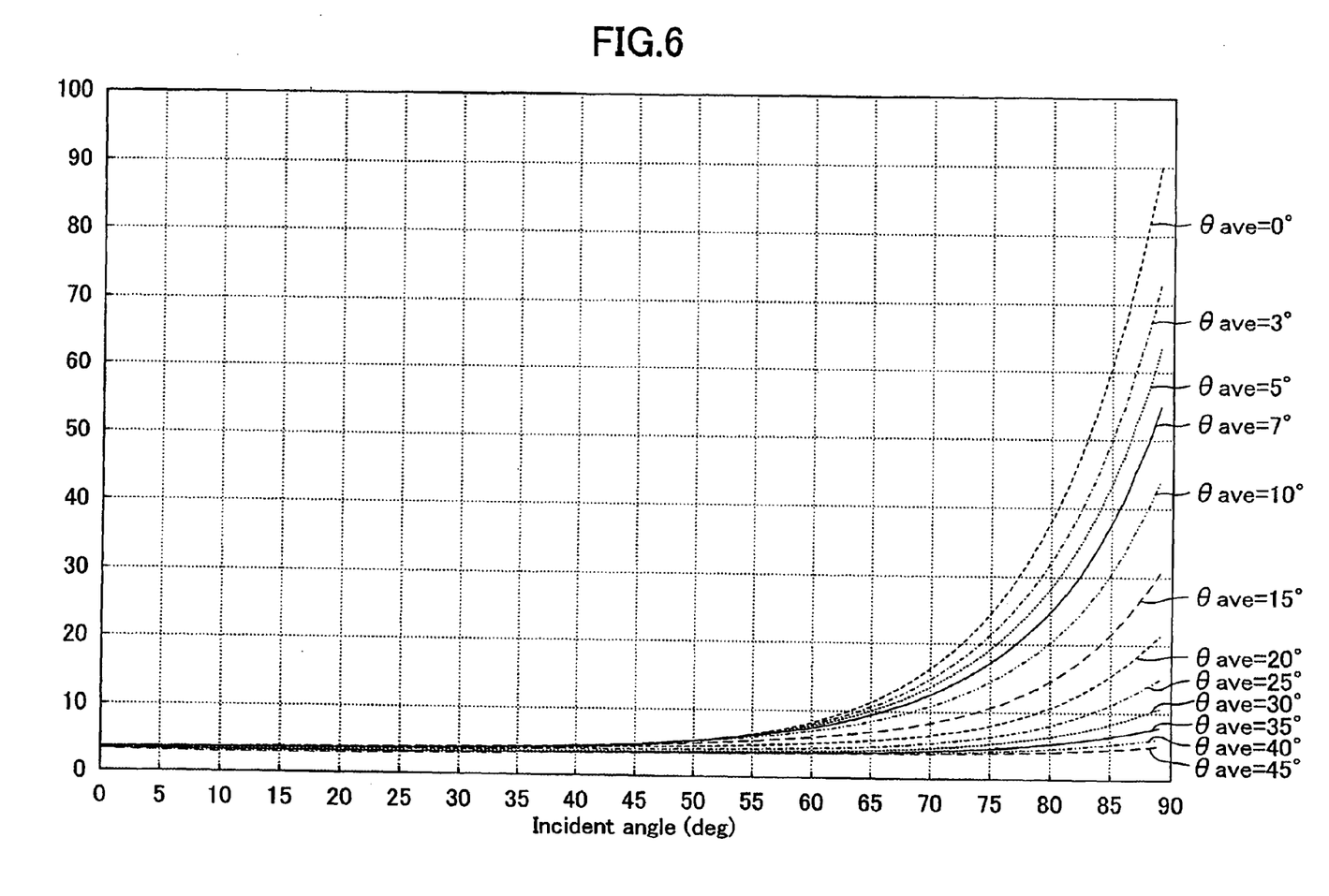
FIG. 6 is a graph showing the correlation between $\theta_{ave}$ and reflection coefficient.

FIG. 6 is a graph showing the correlation between $\theta_{ave}$ and reflection coefficient.

As shown in FIG. 6, as $\theta_{ave}$ increases, the dependency on incident angle is reduced, so that a high antireflection effect for light at a relatively large incident angle can be achieved. Specifically, $\theta_{ave}$ is preferably 5 degrees or more. In such case, compared to the case where the fine concave/convex portions 11 are formed on a smooth surface, the reflection coefficient of light at an incident angle of 89 degrees can be reduced by about 30% or more. More preferably, $\theta_{ave}$ is 10 degrees or more. In such case, compared to the case where the fine concave/convex portions 11 are formed on a smooth surface, the reflection coefficient of light at an incident angle of 89 degrees can be reduced by about 50% or more. It is even more preferable that $\theta_{ave}$ is 15 degrees or more. In such case, compared to the case where the fine concave/convex portions 11 are formed on a smooth surface, the reflection coefficient of light at an incident angle of 89 degrees can be reduced by about 30% or more.

Moreover, a peak (i.e., a value of θ which is most frequently included) of a θ distribution is preferably larger than 0 degrees. The peak is more preferably 2 degrees or more, or even more preferably 5 degrees or more.

Figure 8:
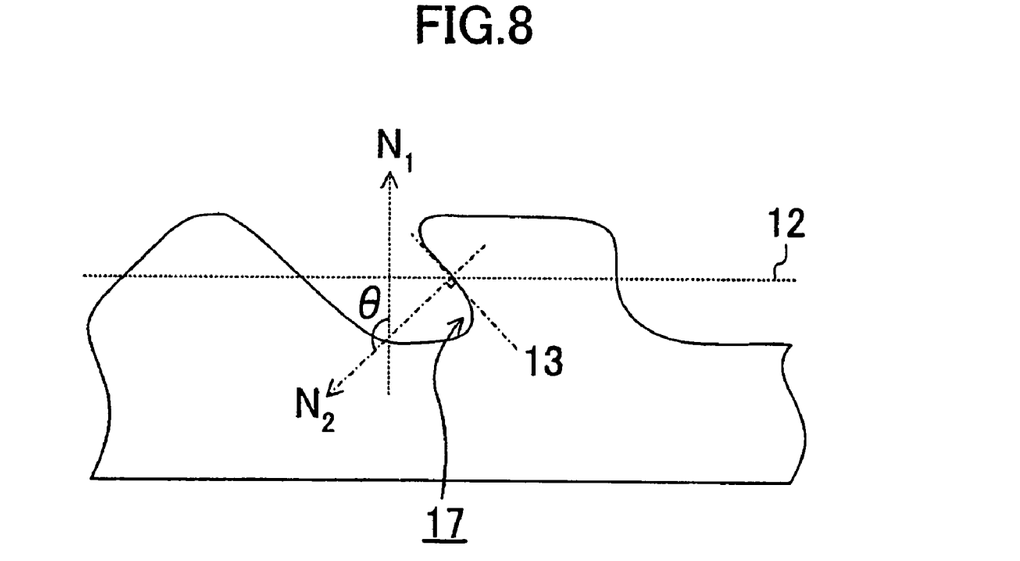
FIG. 8 is a cross-sectional view illustrating the case where θ is larger than 90 degrees.

In views of fabrication, as shown in FIG. 8, it is preferable that part in which an angle (θ) between the normal vector $N_2$ of the tangent plane 13 of the surface 10 and the normal vector $N_1$ of the reference plane 12 of the surface 10 is larger than 90 degrees does not exist. In other words, it is preferable that the surface 10 is substantially formed of a plane having a roughness shape of θ≦90 degrees. As shown in FIG. 8, when the part in which θ is larger than 90 degrees exists, it is difficult to form the fine concave/convex portions 11 on a surface facing to a depression portion 17.

In this embodiment, the antireflection structure of the present invention has been described using the light transmitting diffusing plate 1 as an example. However, the antireflection structure of the present invention is not limited to a light transmitting structure but may be, for example, a light absorbing structure, i.e., a so-called black body.

Moreover, in this embodiment, an example where the SWS is formed directly on the surface 10 of the diffusing plate 1 has been described. However, a seal in which the SWS is formed may be adhered or cohered onto a flat and smooth surface to form the surface 10. In other words, the diffusing plate 1 does not have to be a single unit body, but may be formed of a plurality of components.

In this embodiment, an example where the SWS is formed throughout the surface 10 has been described. However, the SWS does not have to be provided throughout the surface 10, but may be formed only in necessary part. In such case, as well as the part in which the SWS is provided, other part of the surface 10 may be a rough surface having the same surface roughness as the surface roughness of the part in which the SWS is provided or may be a smooth surface having a smaller surface roughness than the surface roughness of the part in which the SWS is provided. Furthermore, some other antireflection structure including a multilayer film of a film having a relatively low reflection coefficient and a film having a relatively large reflection coefficient may be formed in part in which the SWS is not formed. Moreover, even in the part in which the SWS is formed, a height and a cycle (pitch) of the SWS may be adjusted as necessary.

The present invention is not limited to the above-described embodiment and various modifications are possible without departing from the spirit and material features of the present invention. The above-described embodiment is merely an example in all aspects and its interpretation is not to be limited. The scope of the present invention is indicated by the scope of claims and not limited by the specification. Furthermore, all changes and modifications belonging to the scope of equivalents of the claims fall within the scope of the present invention.

What is claimed is:

1. An antireflection structure for suppressing reflection of light having a wavelength equal to or larger than a predetermined wavelength, the antireflection structure comprising:
   a surface having a roughness shape with a larger surface roughness than the predetermined wavelength; and
   a plurality of fine concave/convex portions regularly arranged on the surface within a cycle equal to or smaller than the predetermined wavelength, wherein:
   the surface is configured so that a percentage of an area per unit area of part in which angles between normal vectors of tangent planes of the roughness shape of the surface and normal vectors of a reference plane of the surface which is obtained by cutting off the fine concave/convex portions and the roughness shape is 10 degrees or less is less than 90%,
   each of the plurality of fine concave/convex portions has a height equal to or larger than 0.4 times as large as a wavelength of light of which reflection is suppressed, and
   a surface roughness of the surface in terms of a maximum height roughness Rz defined by ISO4287:1997 is larger than the predetermined wavelength.

2. The antireflection structure of claim 1, wherein the antireflection structure transmits the light of which reflection is suppressed.

3. The antireflection structure of claim 1, wherein the fine concave/convex portions are approximately conical/pyramidal concaves and convexes, or filiform concaves and filiform convexes.

4. The antireflection structure of claim 1, wherein a surface roughness of the surface in terms of a maximum height roughness Rz defined by ISO4287:1997 is larger than the predetermined wavelength.

5. The antireflection structure of claim 1, wherein a surface roughness of the surface in terms of a maximum height roughness Rz defined by ISO4287:1997 is smaller than 100 μm.

6. The antireflection structure of claim 1, wherein a surface roughness of the surface in terms of a maximum height roughness Rz defined by ISO4287:1997 is smaller than 50 μm.

7. The antireflection structure of claim 1, wherein a surface roughness of the surface in terms of a maximum height roughness Rz defined by ISO4287:1997 is smaller than 30 μm.

8. The antireflection structure of claim 1, wherein respective heights of the plurality of fine concave/convex portions from the surface in a normal direction of the reference plane are approximately the same.

9. The antireflection structure of claim 1, wherein the surface is substantially configured so that the angle between the normal vector of the tangent plane of the roughness shape and the normal vector of the reference plane of the surface is 90 degrees or less.

10. The antireflection structure of claim 1, wherein each of the plurality of fine concave/convex portions is a conical/pyramidal concave or convex and respective center axes of the plurality of fine concave/convex portions are parallel to each other, each of the center axes connecting a center of a base and a top point of each of the concave/convex portions.

11. An optical device comprising the antireflection structure of claim 1.

12. The antireflection structure of claim 1, wherein the antireflection structure absorbs the light of which reflection is suppressed.

* * * * *